US012646896B2

(12) United States Patent
Hernandez

(10) Patent No.: US 12,646,896 B2
(45) Date of Patent: Jun. 2, 2026

(54) CONNECTOR BRACKET AND WIRE HARNESS

(71) Applicant: SUMITOMO WIRING SYSTEMS, LTD., Mie (JP)

(72) Inventor: Noly Hernandez, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 314 days.

(21) Appl. No.: 18/280,634

(22) PCT Filed: Feb. 17, 2022

(86) PCT No.: PCT/JP2022/006313
§ 371 (c)(1),
(2) Date: Sep. 6, 2023

(87) PCT Pub. No.: WO2022/190803
PCT Pub. Date: Sep. 15, 2022

(65) Prior Publication Data

US 2024/0136752 A1 Apr. 25, 2024
US 2024/0235090 A9 Jul. 11, 2024

(30) Foreign Application Priority Data

Mar. 9, 2021 (JP) ................................ 2021-037548

(51) Int. Cl.
*H01R 13/73* (2006.01)
*H01R 13/506* (2006.01)

(52) U.S. Cl.
CPC ........... *H01R 13/73* (2013.01); *H01R 13/506* (2013.01); *H01R 2201/26* (2013.01)

(58) Field of Classification Search
CPC .... H01R 13/73; H01R 13/639; H01R 13/508; H01R 13/518
(Continued)

(56) References Cited

U.S. PATENT DOCUMENTS 5,042,114 A * 8/1991 Parrish .................... F16L 3/233 24/17 AP
6,976,870 B1 * 12/2005 Li ........................ H01R 13/659 439/541.5
(Continued)

FOREIGN PATENT DOCUMENTS

EP 1081806 A1 * 3/2001 ........... H01R 13/748
JP S58-065777 U1 5/1983
(Continued)

OTHER PUBLICATIONS

KR-20180101300-A original with translation (Year: 2018).*
International Search Report issued on Apr. 12, 2022 for WO 2022/190803 A1 (4 pages).

*Primary Examiner* — Marcus E Harcum
(74) *Attorney, Agent, or Firm* — Venjuris, P.C.

(57) ABSTRACT

A connector bracket (14) includes a first holding portion (20) and a second holding portion (21) that hold a first connector (10). The first holding portion (20) is a portion to which the first connector (10), which is provided at one end of a first electric wire (5), is attached with a rail structure, the first holding portion (20) holding the attached first connector (10) with the rail structure. The second holding portion (21) cooperates with the first holding portion (20) to hold the first connector (10). The second holding portion (21) is a band portion (34) that supports the first connector (10) by surrounding it around the periphery thereof with a band-shaped binding portion (33).

15 Claims, 7 Drawing Sheets

(58) Field of Classification Search
USPC .......................................................... 439/371
See application file for complete search history.

(56) References Cited

U.S. PATENT DOCUMENTS

| | | | | |
|---|---|---|---|---|
| 7,207,826 | B1 * | 4/2007 | Yang | H01R 13/6395 439/373 |
| 7,264,497 | B1 * | 9/2007 | Lewis | H01R 13/6392 439/373 |
| 7,354,297 | B2 * | 4/2008 | Tsukashima | H01R 13/595 439/373 |
| 7,731,512 | B1 * | 6/2010 | Montena | H01R 4/64 439/97 |
| 9,666,983 | B2 * | 5/2017 | Kitamura | H01R 13/631 |
| 9,722,353 | B2 * | 8/2017 | Maki | H01R 13/6275 |
| 9,722,357 | B1 * | 8/2017 | Helgeson | H01R 13/6395 |
| 9,806,470 | B2 * | 10/2017 | Okamoto | H01M 50/503 |
| 9,865,969 | B2 * | 1/2018 | Ebisawa | H01R 13/639 |
| 9,960,535 | B2 * | 5/2018 | Kida | H01R 13/6275 |
| 10,535,953 | B2 * | 1/2020 | Kondo | H01R 13/6315 |
| 11,152,737 | B2 * | 10/2021 | Shimizu | H01R 13/516 |
| 2005/0064756 | A1 * | 3/2005 | Hsiao | H01R 13/6272 439/357 |
| 2008/0146069 | A1 * | 6/2008 | Fawcett | H01R 13/6395 439/153 |
| 2014/0131528 | A1 * | 5/2014 | Blakeley | H02G 3/32 248/74.2 |
| 2015/0093932 | A1 * | 4/2015 | Ning | H01R 13/6392 439/369 |
| 2018/0034189 | A1 * | 2/2018 | Li | H01R 13/518 |
| 2019/0157851 | A1 * | 5/2019 | Okamoto | H01M 10/482 |
| 2019/0168697 | A1 | 6/2019 | Washihira | |
| 2020/0390237 | A1 * | 12/2020 | Cvek | H01R 13/73 |
| 2021/0311093 | A1 * | 10/2021 | Babcock | H01R 13/639 |

FOREIGN PATENT DOCUMENTS

| | | | | | |
|---|---|---|---|---|---|
| JP | H06-073411 | U1 | | 10/1994 | |
| JP | H0858752 | A | * | 3/1996 | |
| JP | H08-180933 | A | | 7/1996 | |
| JP | 11233170 | A | * | 8/1999 | |
| JP | 2010-146888 | A | | 7/2010 | |
| KR | 200411036 | Y1 | * | 3/2006 | H01R 13/6272 |
| KR | 20180101300 | A | * | 9/2018 | H01R 13/73 |
| TW | M266595 | U | * | 6/2005 | H01R 13/6461 |
| WO | WO-2013031201 | A1 | * | 3/2013 | H01R 13/73 |

* cited by examiner

CONNECTOR BRACKET AND WIRE HARNESS

CROSS REFERENCE TO RELATED APPLICATIONS

This application is a national phase of PCT application No. PCT/JP2022/006313, filed on 17 Feb. 2022, which claims priority from Japanese patent application No. 2021-037548, filed on 9 Mar. 2021, all of which are incorporated herein by reference.

TECHNICAL FIELD

The present invention relates to a connector bracket for holding a connector and a wire harness.

BACKGROUND

Patent Document 1 discloses a conventional structure for locking a connector to a holder disposed within an electrical junction box. In Patent Document 1, the connector is attached to the holder by engaging rail projections provided on the connector with rail recesses provided on the holder.

PRIOR ART DOCUMENT

Patent Document

Patent Document 1: JP H08-180933 A

SUMMARY OF THE INVENTION

Problems to be Solved

Incidentally, a cable with a connector at one end portion thereof is subjected to a load that pulls it in all directions while it is being assembled to a vehicle body. For this reason, there is high demand for the development of a technology that enables secure attachment of a connector to a holder.

An object of the present disclosure is to provide a connector bracket and a wire harness that make detachment of an attached connector less likely to occur.

Means to Solve the Problem

A connector bracket according to one aspect of the present disclosure includes a first holding portion to which a connector provided at one end portion of an electric wire is attached using a rail structure, the first holding portion holding the connector attached to the rail structure using the rail structure; and a second holding portion that holds the connector in cooperation with the first holding portion.

A wire harness according to one aspect of the present disclosure includes the connector bracket and the electric wire having at an end portion thereof the connector held by the connector bracket.

Effect of the Invention

According to the present disclosure, an attached connector can be made less likely to detach from the connector bracket.

DETAILED DESCRIPTION TO EXECUTE THE INVENTION

Figure 1A:
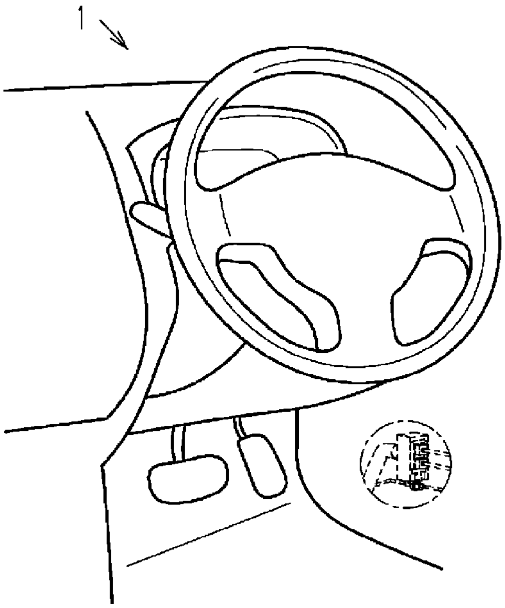
FIG. 1A is a perspective view showing how a connector bracket is attached in a vehicle.

First, embodiments of the present disclosure will be listed and described.

[1] A connector bracket of the present disclosure includes a first holding portion to which a connector provided at one end portion of an electric wire is attached using a rail structure, the first holding portion holding the connector attached to the rail structure using the rail structure; and a second holding portion that holds the connector in cooperation with the first holding portion.

According to this configuration, to hold the connector using the connector bracket, the connector can be supported on the connector bracket by a plurality of holding portions, namely the first holding portion and the second holding portions. Therefore, the attached connector can be made less likely to detached from the connector bracket.

[2] With the electric wire being a first electric wire and the connector being a first connector, the connector bracket includes a bracket body that holds a second connector connected to a second electric wire different from the first electric wire. According to this configuration, the connector bracket can be configured to hold a plurality of connectors.

[3] The first holding portion holds the connector at a first held region of the connector. The second holding portion holds the connector at a second held region of the connector that is a portion different from the first held region. According to this configuration, to hold the connector with the connector bracket, the connector can be supported at a plurality of portions, further serving to make the connector less likely to detach from the connector bracket.

[4] The first held region is located on a first surface of the connector. The second held region is located on a second surface of the connector that is a surface opposite to the first surface. According to this configuration, to hold the connector with the connector bracket, the connector can be supported by a plurality of surfaces in a well-balanced manner. This further serves to make the connector less likely to detach from the connector bracket.

[5] The first holding portion and the second holding portion are disposed on one end and portion the another end portion, respectively, of the connector in a direction of insertion of the connector. According to this configuration, the connector bracket can support the connector at two ends in the direction of insertion of the connector. Therefore, the connector can be supported in a balanced manner, further serving to make the connector less likely to detach from the connector bracket.

[6] The second holding portion is a band portion that supports the connector by surrounding the connector with a band-shaped binding portion. According to this configuration, the connector can be supported by the band-shaped binding portion over a wide area, further serving to make the connector less likely to be detach from the bracket.

[7] The band portion supports the portion of the connector where a partner connector is connected. According to this configuration, the band portion can support the portion of the connector readily subjected to a load. This further serves to make the connector less likely to detach from the connector bracket.

[8] With the electric wire being a first electric wire and the connector being a first connector, the connector bracket includes a bracket body that holds a second connector connected to a second electric wire different from the first electric wire. The band portion is integrally formed with the bracket body. According to this configuration, the bracket body and the band portion can be manufactured as an integrated component.

[9] The band portion includes an engaging portion that keeps the binding portion in a closed state where the connector is held by the binding portion. According to this configuration, the engaging portion can securely maintain the closed state of the binding portion.

[10] The band portion includes a tab portion serving as a portion by which the binding portion is gripped when the binding portion is opened and closed. As this configuration facilities the gripping of the band portion with fingers or the like, it can increase the ease with which the binding portion is brought into the closed state.

[11] The band portion includes a regulating portion that regulates an operation to push the tab portion in a direction to release the closed state of the binding portion. This configuration can make it unlikely that the closed state of the binding portion will be inadvertently released.

[12] With the electric wire being a first electric wire and the connector being a first connector, the connector bracket includes the bracket body that holds a second connector connected to a second electric wire different from the first electric wire. The connector bracket includes a locking portion that locks the connector attached to the first holding portion to the bracket body. According to this configuration, the connector can remain securely fixed to the first holding portion by the locking portion. This further serves to make the connector less likely to become detached.

[13] A wire harness of the present disclosure includes the connector bracket and the electric wire having at an end portion thereof the connector held by the connector bracket. According to this configuration, the same advantageous effects as those of the foregoing connector bracket can be obtained.

Details of Embodiments of Present Disclosure

Specific examples of a connector bracket and a wire harness of the present disclosure will be described below with reference to the drawings. Note that the present invention is not limited to these examples, and is indicated by the claims, and is intended to include all modifications within the meaning and range of equivalency to the claims. In each drawing, for convenience of description, portions of structures may be exaggerated or simplified. Also, the dimensional proportions of portions may differ from the actual dimensional proportions.

Figure 1B:
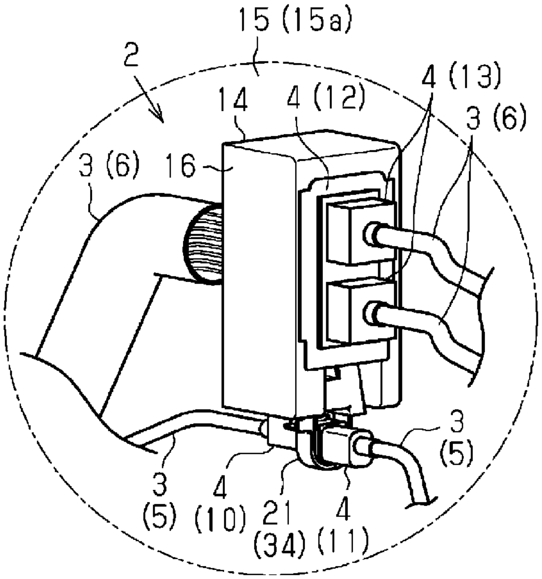
FIG. 1B is an enlarged view of a portion in FIG. 1A.

As shown in FIGS. 1A and 1B, a vehicle 1 includes a wire harness 2 that electrically connects electrical components provided in the vehicle 1 to each other. The wire harness 2 is formed by connecting a plurality of electric wires 3. Each electric wire 3 has a connector 4 at one end portion thereof, and the electric wires 3 are electrically connected to each other by joining the connectors 4 to each other. For example, the electric wires 3 include, for example, first electric wires 5 and second electric wires 6. The first electric wires 5 are, for example, Ethernet (registered trademark) cables for connecting devices that form an in-vehicle network LAN (Local Area Network). The second electric wires 6 are, for example, a group of electric wires for electrically connecting in-vehicle devices.

The two first wires 5 are electrically connected to each other by mating a first connector 10 that is the connector 4 of one of the first wires 5 with a partner connector 11 that is the connector 4 of the other first wire 5. The two second wires 6 are electrically connected by mating a second connector 12 that is the connector 4 of one of the second wires 6 with a partner connector 13 that is the connector 4 of the other second wire 6. It should be noted that, in the example in FIGS. 1A and 1B, while there are two partner connectors 13 for the second electric wires 6, there may be one, or three or more partner connectors 13.

The connectors 4 are attached to a vehicle body 15 via a connector bracket 14 that holds the connectors 4. Only one or multiple connector brackets 14 may be provided in the vehicle 1. The connector bracket 14 is fixedly mounted to, for example, a side surface of a vehicle body wall portion 15*a* that constitutes the driver's seat. Any known fixing structure for mounting the connector bracket 14 to the vehicle body 15 can be employed as appropriate.

The connector bracket 14 includes a bracket body 16 that holds the second connector 12 connected to the second electric wires 6. The bracket body 16 is formed to have openings on opposing side surfaces thereof and fixedly houses the second connector 12 in the openings.

Figure 2:
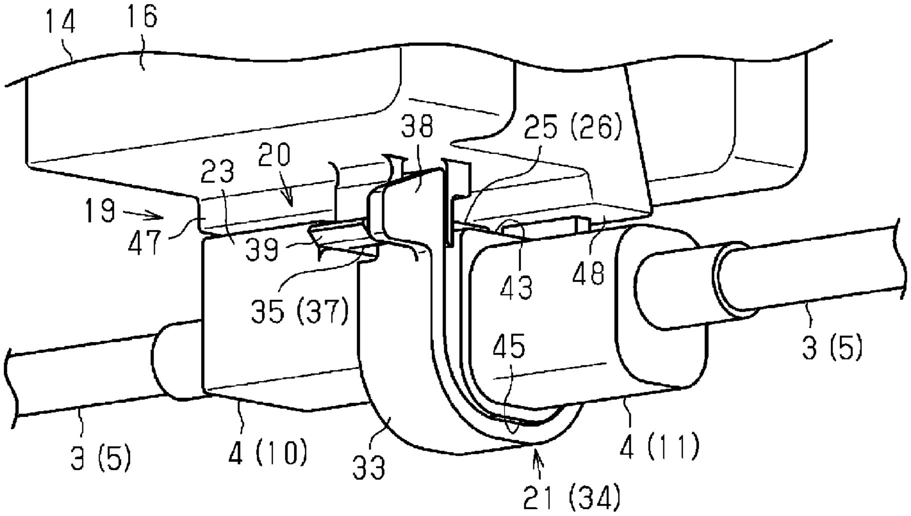
FIG. 2 is a perspective view showing a holder portion of the connector bracket.
Figure 3:
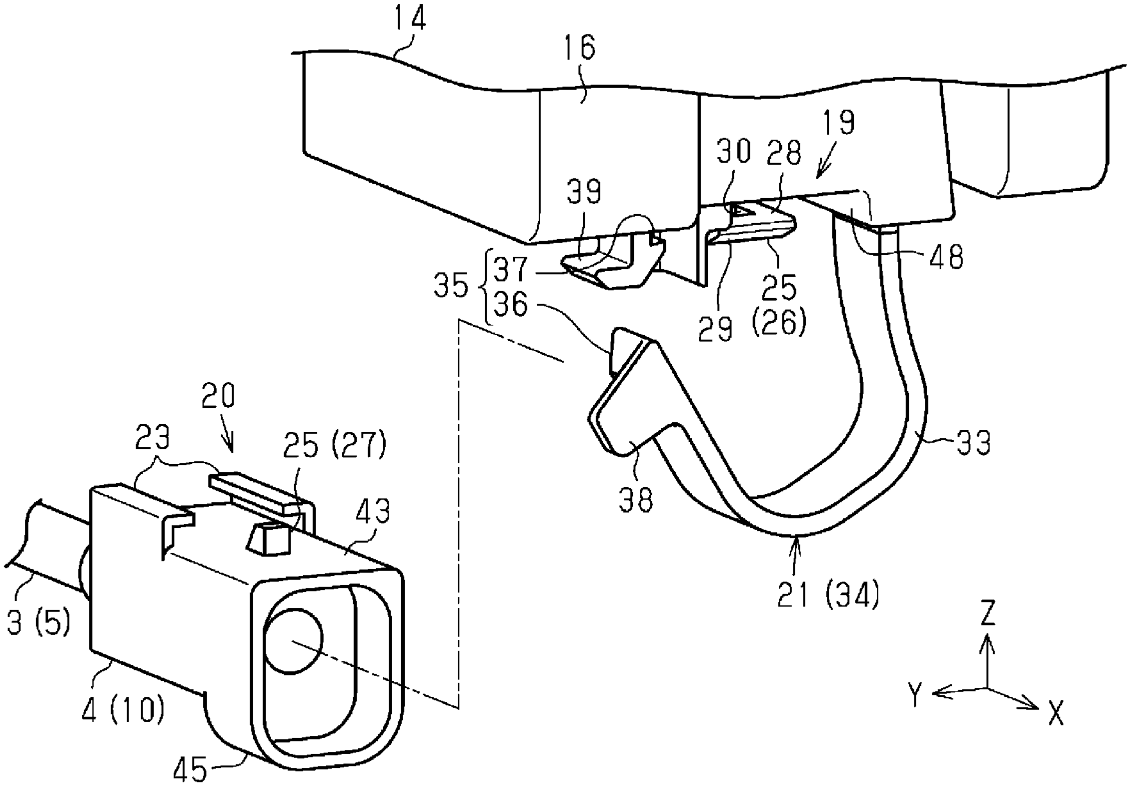
FIG. 3 is an exploded perspective view showing the holder portion of the connector bracket.

As shown in FIGS. 2 and 3, the connector bracket 14 includes a holder portion 19 that holds the first connector 10 connected to the first electric wire 5. The holder portion 19 is disposed, for example, on an external surface of the bracket body 16 that may be a bottom surface thereof. The first electric wires 5 are held on an external surface of the bracket body 16 that may be the bottom surface thereof. The connector bracket 14 (the holder portion 19) includes a first holding portion 20 that holds the first connector 10 and a second holding portion 21 that holds the first connector 10 in cooperation with the first holding portion 20. As such, the connector bracket 14 holds the first connector 10 using two portions, namely the first holding portion 20 and the second holding portion 21.

Figure 4:
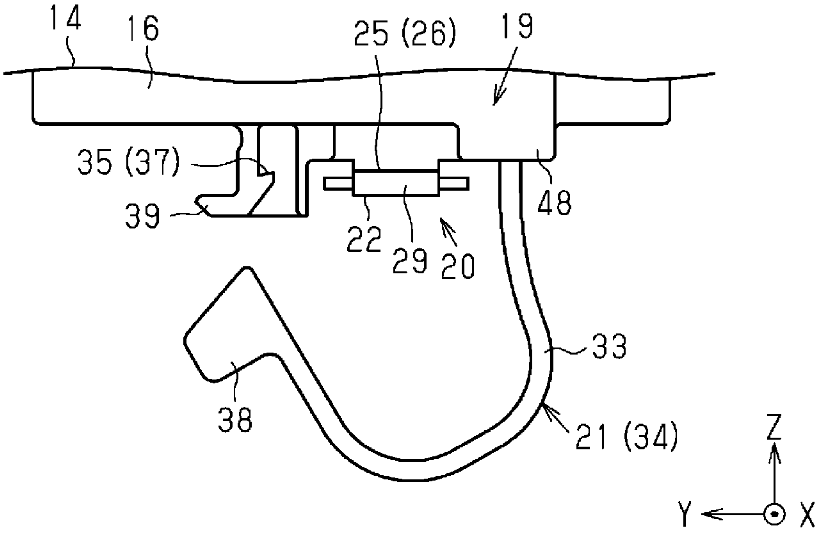
FIG. 4 is a front view showing the holder portion of the connector bracket.
Figure 5:
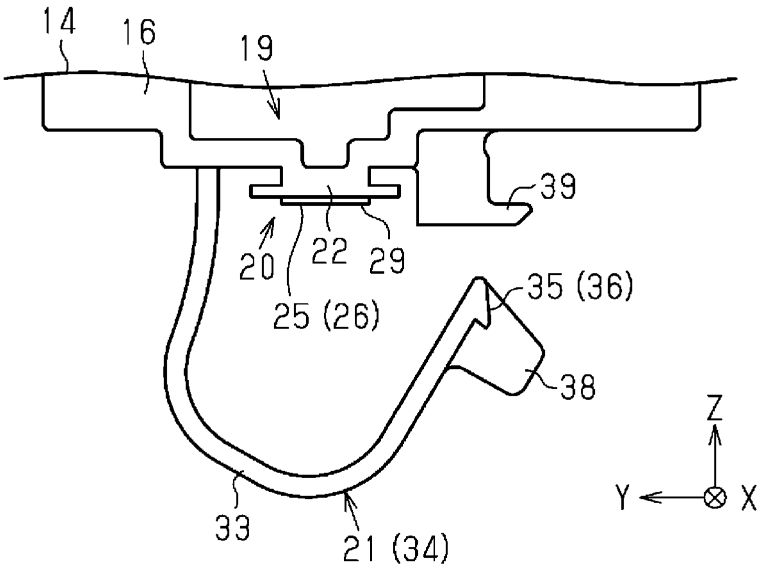
FIG. 5 is a rear view showing the holder portion of the connector bracket.

As shown in FIGS. 3 to 5, the first holding portion 20 is a portion to which the first connector 10, to which a first electric wire 5 is connected, is attached using a rail structure, the first holding portion 20 holding the attached first connector 10 using the rail structure. The rail structure includes a guide rail 22 (see FIG. 4, etc.) that extends in a linear slide direction of the first connector 10 (the X-axis direction in FIG. 3, etc.) and movement rails 23 that engage with the guide rail 22 to move along the guide rail 22. For example, the guide rail 22 is provided on the bracket body 16 and the movement rails 23 are provided on the first connector 10. The guide rail 22 is disposed, for example, on an external surface of the bracket body 16 that may be a bottom surface thereof, and may be a T-shaped rail. The movement rails 23 are disposed on an external surface of the first connector 10 that may be a top surface thereof.

Figure 6:
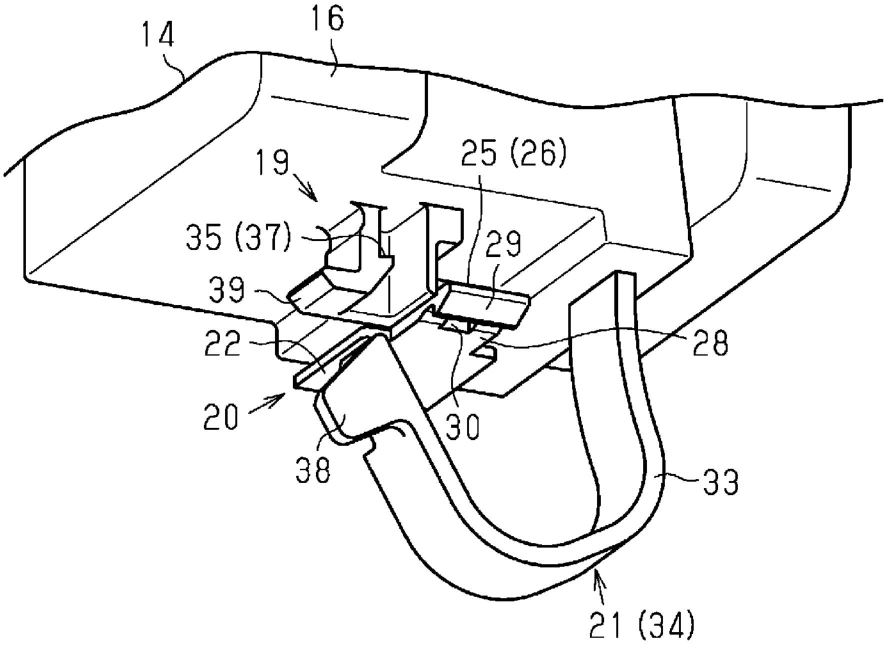
FIG. 6 is a perspective view of the holder portion prior to the connector being attached as seen from the front side.
Figure 7:
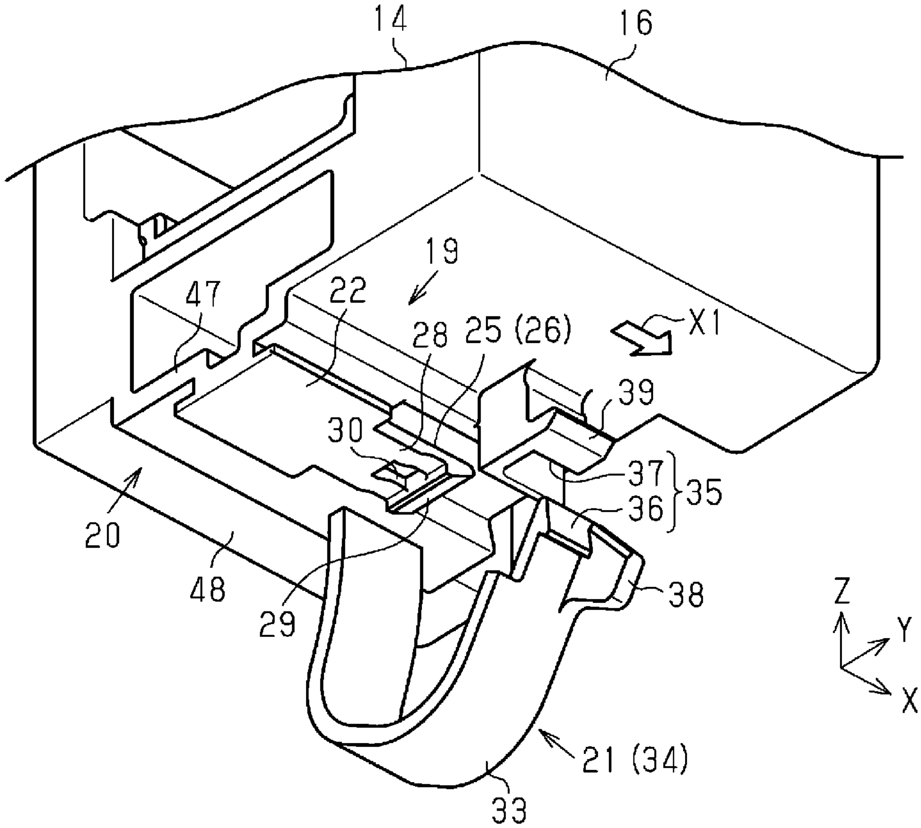
FIG. 7 is a perspective view of the holder portion prior to the connector being attached as seen from the rear side.

As shown in FIGS. 3, 6, and 7, the connector bracket 14 (the holder portion 19) includes a locking portion 25 that locks the first connector 10 attached to the first holding portion 20 to the bracket body 16. For example, the locking portion 25 includes an engaging piece 26 provided on the bracket body 16 and a protrusion 27 provided on the first connector 10. The engaging piece 26 is disposed at an end portion of the guide rail 22 and formed so as to protrude in the direction in which the first connector 10 is inserted and pulled out (the +X-axis direction in FIG. 3, etc.). For example, the engaging piece 26 includes a plate-shaped main body 28 and a lug portion 29 disposed at the leading end of the main body 28. The main body 28 is internally provided with a recessed portion 30 with which the protrusion 27 engages. The protrusion 27 is disposed on the top surface of the first connector 10. When the first connector 10 is fully inserted on the guide rail 22, the locking section 25 locks the first connector 10 attached to the guide rail 22 to the bracket body 16 in response to the protrusion 27 of the first connector 10 entering the recessed portion 30 of the engaging piece 26 and the lug portion 29 engaging with the projection 27.

As shown in FIG. 3, the second holding portion 21 is a band portion 34 that supports the first connector 10 by surrounding it with a band-shaped binding portion 33. The band portion 34 is integrally formed with the bracket body 16. The band portion 34 supports the portion of the first connector 10 to which the partner connector 11 is connected (see FIG. 2, etc.) (specifically, for example, the leading end region of the first connector 10).

As shown in FIG. 7, the band portion 34 includes an engaging portion 35 for keeping the binding portion 33 in a closed state where the first connector 10 is held by the binding portion 33. The engaging portion 35 includes a protrusion 36 provided at the leading end of the binding portion 33 and an engaged portion 37 that engages with the protrusion 36. The engaged portion 37 is a groove on which the protrusion 36 can be hooked. When the protrusion 36 is not engaged with the engaged portion 37, the band portion 34 is in an open state, and when the protrusion 36 is engaged with the engaged portion 37, the band portion 34 is in the closed state in which the binding portion 33 is closed.

The band portion 34 includes a tab portion 38 serving as a portion by which the binding portion 33 is gripped when the binding portion 33 is opened and closed. The tab portion 38 is, for example, a wide protruding piece provided at the leading end of the binding portion 33.

The band portion 34 includes a regulating portion 39 that regulates an operation to push the tab portion 38 in a direction in which the closed state of the engaging portion 35 (the direction indicated by the X1 arrow in FIG. 7) is released. The regulating portion 39 is a portion made thick around the engaged portion 37 (projection). Once the protrusion 36 is engaged with the engaged portion 37 to keep the binding portion 33 in the closed state, the regulating portion 39 is positioned at the back surface of the tab portion 38 to prevent an operator from inadvertently touching the back surface of the tab portion 38 with his/her finger or the like.

Figure 8:
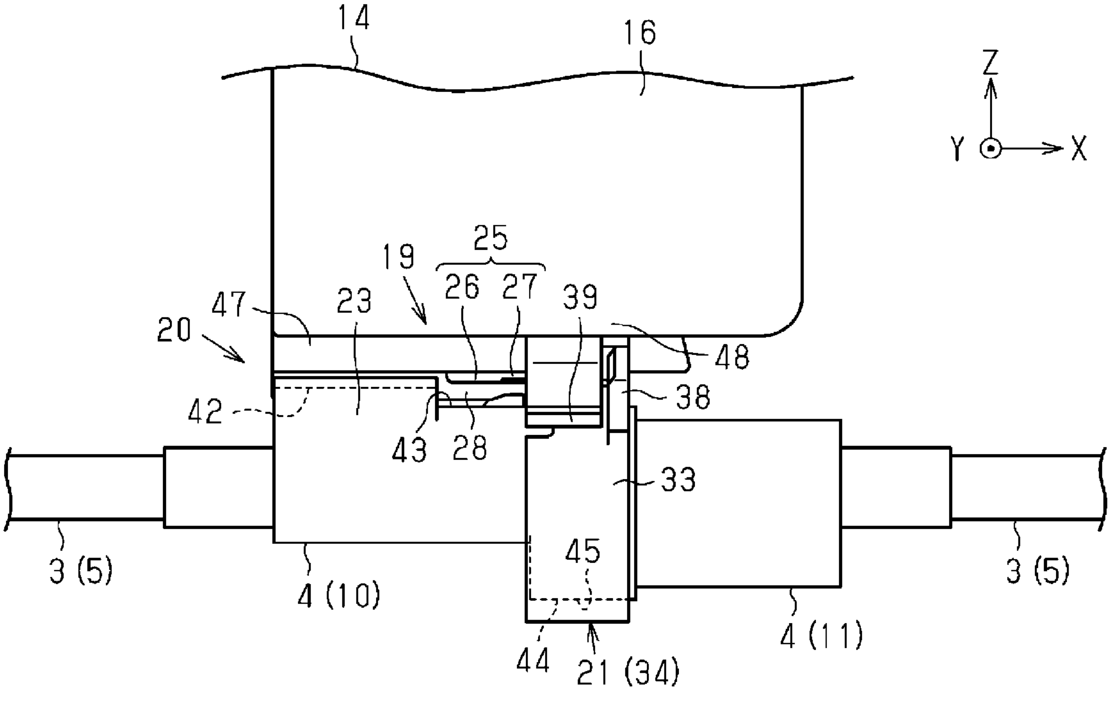
FIG. 8 is a side view showing the holder portion of the connector bracket.

As shown in FIG. 8, the first holding portion 20 holds the first connector 10 at first held regions 42 of the first connector 10. The first held regions 42 refer to the portions of the first connector 10 that are held by the first holding portion 20. Specifically, the first held regions 42 are regions of the movement rails 23 of the first connector 10. The first held regions 42 are located on a first surface 43 of the first connector 10. For example, the first surface 43 is the top surface of the first connector 10.

The second holding portion 21 holds the first connector 10 at a second held region 44 of the first connector 10 that is a portion different from the first holding portion 20. The second held region 44 refers to the portion of the first connector 10 that is held by the second holding portion 21. The second held region 44 is located on a second surface 45 of the first connector 10 that is a surface on a side opposite to the first surface 43. For example, the second surface 45 is a bottom surface of the first connector 10.

The first holding portion 20 and the second holding portion 21 are disposed at one end portion 47 and another end portion 48, respectively, of the first connector 10 in the direction of insertion of the first connector 10 (the X-axis direction in FIG. 8), which may be a linear slide direction of the first connector 10. In this way, the first holding portion 20 and the second holding portion 21 are disposed separately from each other at two ends of the first connector 10 in the insertion direction thereof (the X-axis direction in FIG. 8).

Next, operation of the connector bracket 14 of this embodiment will be described.

Figure 9:
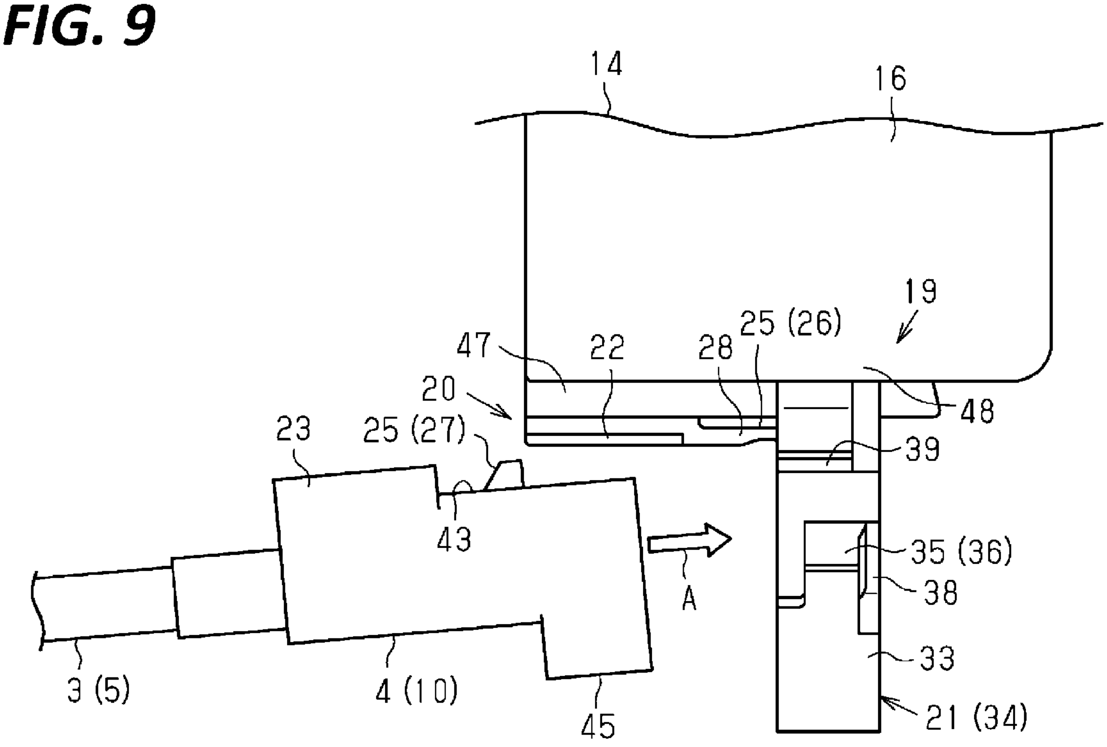
FIG. 9 is a diagram showing an attachment step of the connector.

As shown in FIG. 9, to attach the first connector 10 to the connector bracket 14, first, the first connector 10 is passed through the unbound band portion 34. That is, the first connector 10 is inserted in the direction indicated by the arrow A in FIG. 9 so as to be on the inner side of the unbound band portion 34.

Figure 10:
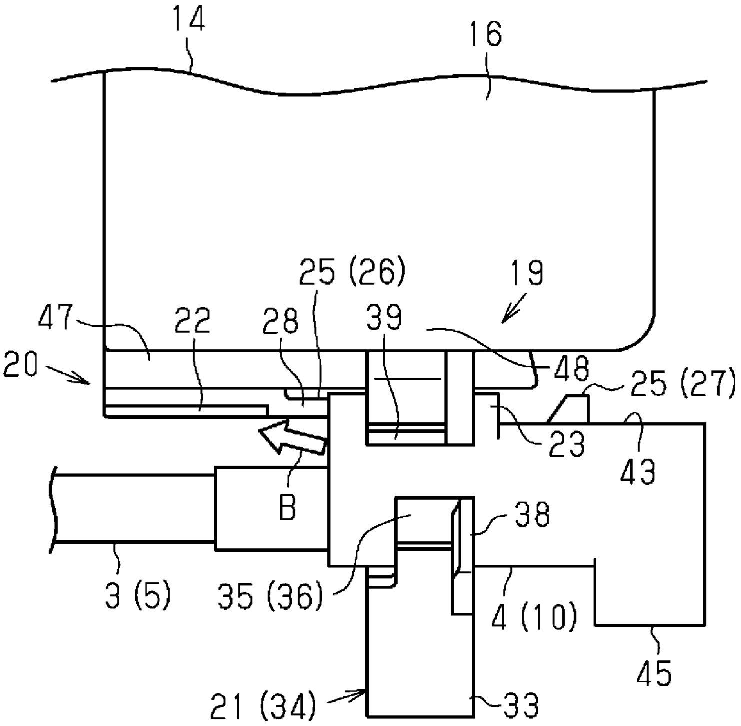
FIG. 10 is a diagram showing an attachment step of the connector.

As shown in FIG. 10, once the first connector 10 has been passed through the band portion 34, the first connector 10 is attached to the guide rail 22 of the connector bracket 14. Specifically, as the first connector 10, which has been passed through the band portion 34, is being pulled back (in the direction indicated by the arrow B in FIG. 10), the movement rails 23 of the first connector 10 are inserted on the guide rail 22 of the connector bracket 14.

Figure 11:
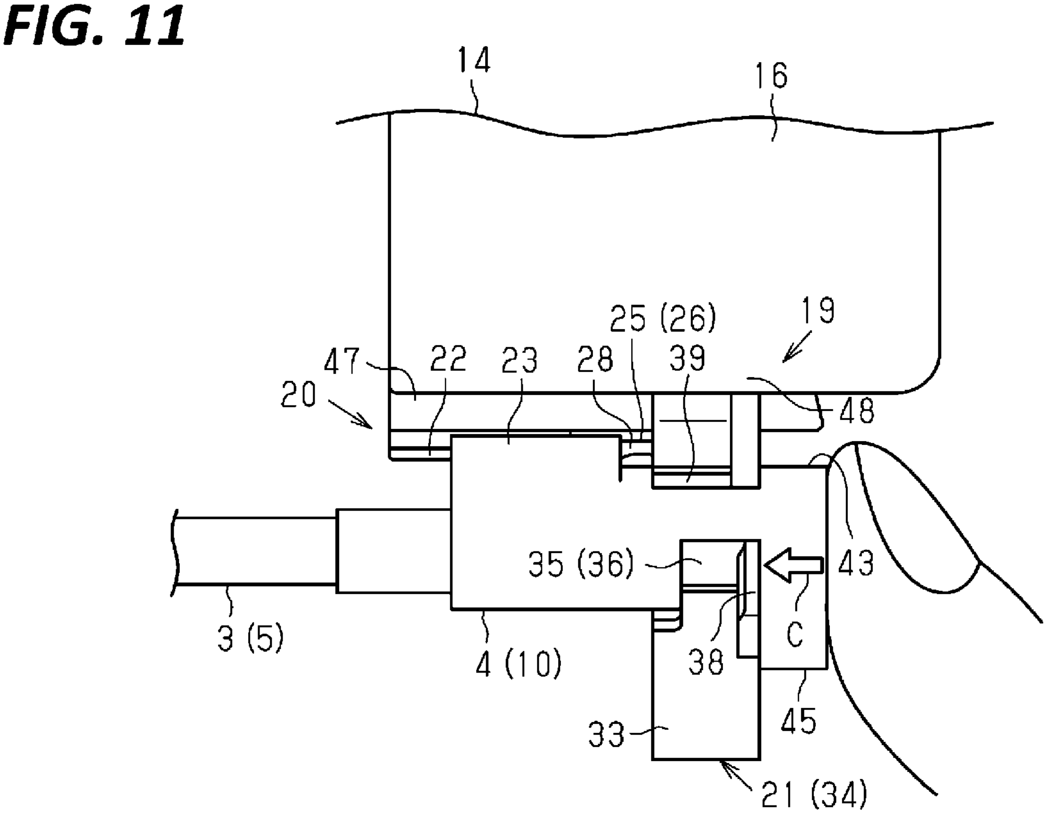
FIG. 11 is a diagram showing an attachment step of the connector.

As shown in FIG. 11, the movement rails 23 of the first connector 10 are fully inserted on the guide rail 22 of the connector bracket 14, and the first connector 10 is fully and forcefully pushed with a finger or the like in the direction indicated by the arrow C in FIG. 11 to engage the locking portion 25. That is, the first connector 10 is fully inserted on the guide rail 22 of the connector bracket 14 and the protrusion 27 of the first connector 10 is engaged with the recessed portion 30 of the connector bracket 14, thus locking the first connector 10 in an attached state.

Figure 12:
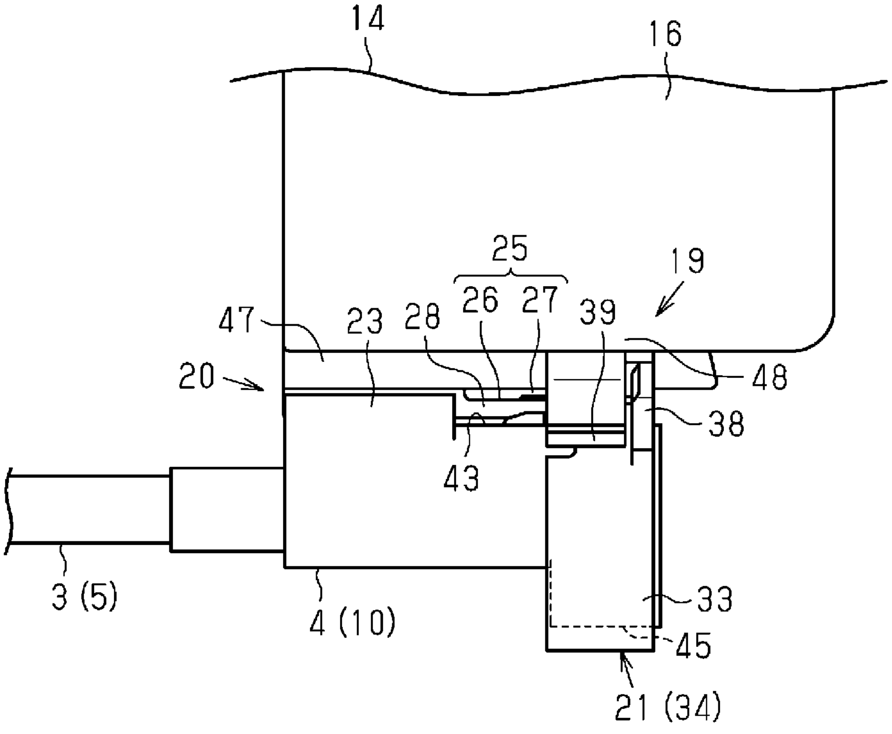
FIG. 12 is a diagram showing an attachment step of the connector.

As shown in FIG. 12, once the first connector 10 is fully inserted on the guide rail 22 of the connector bracket 14 and locked, the first connector 10 is secured using the band portion 34. For example, the binding portion 33 of the band portion 34 circumferentially surrounds the first connector 10, and the protrusion 36 at the leading end of the binding portion 33 is laterally inserted into and engaged with the engaged portion 37 of the bracket body 16. In this way, the attachment of the first connector 10 to the connector bracket 14 is complete.

Figure 13:
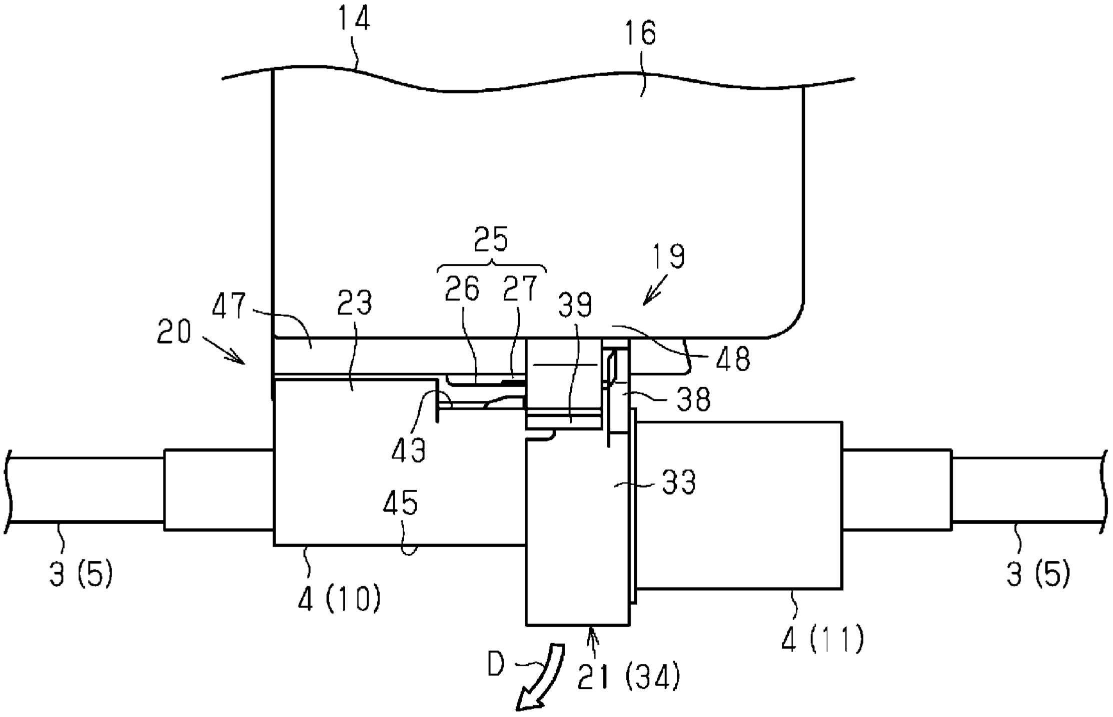
FIG. 13 is a schematic diagram of the first connector under an excessive load.

As shown in FIG. 13, the partner connector 11 is connected to the first connector 10, which has been attached to the connector bracket 14. However, when connecting cables to the vehicle, the partner connector 11 may be subjected to pushing and pulling. At this time, the mating portion between the first connector 10 and the partner connector 11 is subjected to an excessive load in the direction indicated by the arrow D in FIG. 13. In particular, as the position of the first holding portion 20 and the mating portion between the first connector 10 and the partner connector 11 are offset from each other in the vertical direction of the bracket body 16, the application of a load to the mating portion between the first connector 10 and the partner connector 11 in the direction indicated by the arrow D results in the application of excessive stress to the rail structure of the first holding portion 20.

As such, the first connector 10 is supported by two portions, i.e., the first holding portion 20 and the second holding portion 21, and thus, even if a load acting in the direction indicated by the arrow D is applied to the first connector 10, resistance against the load is increased. This can reduce the likelihood of the first connector 10 inadvertently detaching from the connector bracket 14. Furthermore, since the band portion 34 is disposed on the portion of the first connector 10 where it is mated with the partner connector 11, the connector bracket 14 can also securely hold the first connector 10.

The connector bracket 15 of the above-described embodiment can provide the following advantageous effects.

(1) The connector bracket 14 includes the first holding portion 20 and the second holding portion 21. The first holding portion 20 is a portion to which a connector 4 (for example, the first connector 10, also applicable hereinafter) provided at an end portion of an electric wire 3 (for example, the first electric wire 5, also applicable hereinafter) is attached using a rail structure, the first holding portion 20 holding the attached first connector 10 using the rail structure. The second holding portion 21 holds the first connector 10 in cooperation with the first holding portion 20.

According to this configuration, when the first connector 10 is held by the connector bracket 14, the first connector 10 can be supported by the connector bracket 14 at the first holding portion 20 and the second holding portion 21. Therefore, the attached first connector 10 can be made less likely to detach from the connector bracket 14.

(2) With the electric wire 3 being the first electric wire 5 and the connector 4 being the first connector 10, the connector bracket 14 includes the bracket body 16, which holds a second connector 12 connected to a second electric wire 6, which is different from the first electric wire 5. According to this configuration, the connector bracket 14 can be configured as a component capable of holding a plurality of connectors (the first connector 10 and the second connector 12).

(3) The first holding portion 20 holds the first connector 10 at the first held regions 42 of the first connector 10. The second holding portion 21 holds the first connector 10 at the second held region 44 of the first connector 10 that is a portion different from the first held portions 42. According to this configuration, when the first connector 10 is held by the connector bracket 14, the first connector 10 can be supported by a plurality of portions, further serving to make the first connector 10 less likely to detach from the connector bracket 14.

(4) The first held regions 42 are located on the first surface 43 of the first connector 10. The second held region 44 is located on the second surface 45 of the first connector 10, which is a surface on a side opposite to the first surface 43. According to this configuration, when the first connector 10 is held by the connector bracket 14, the first connector 10 can be supported by a plurality of surfaces in a balanced manner. This further serves to make the first connector 10 less likely to detach from the connector bracket 14.

(5) The first holding portion 20 and the second holding portion 21 are disposed at one end portion 47 and the other end portion 48, respectively, of the first connector 10 in the direction of insertion of the first connector 10 (the X-axis direction in FIG. 3, etc.). According to this configuration, the connector bracket 14 can support the first connector 10 at two ends in the direction of insertion thereof. Therefore, the first connector 10 can be supported in a balanced manner, further serving to make the first connector 10 less likely to detach from the connector bracket 14.

(6) The second holding portion 21 is the band portion 34 that supports the first connector 10 by surrounding it with the band-shaped binding portion 33. According to this configuration, the band-shaped binding portion 33 can support the first connector 10 over a wide area, further serving to make the first connector 10 less likely to detach from the connector bracket 14.

(7) The band portion 34 supports the portion of the first connector 10 where the partner connector 11 is connected. According to this configuration, the band portion 34 can support the portion of the first connector 10 that is likely to be subjected to a load. This further serves to make the first connector 10 less likely to detach from the connector bracket 14.

(8) The band portion 34 is integrally formed with the bracket body 16. According to this configuration, the bracket body 16 and the band portion 34 can be manufactured as an integrated component.

(9) The band portion 34 includes the engaging portion 35 for keeping the binding portion 33 in a closed state in which the first connector 10 is held by the binding portion 33. According to this configuration, the engaging portion 35 can securely maintain the closed state of the binding portion 33.

(10) The band portion 34 includes the tab portion 38 serving as the portion by which the binding portion 33 is gripped when the binding portion 33 is opened and closed. As this configuration facilitates the gripping of the band portion 34 with fingers or the like, it can increase the ease with which the binding portion 33 is brought into in the closed state.

(11) The band portion 34 includes the regulating portion 39 for regulating an operation to push the tab portion 38 in the direction with which the closed state of the binding portion 33 is released. This configuration can make it unlikely that the closed state of the binding portion 33 will be inadvertently released.

(12) A locking portion 25 is included that locks the first connector 10 attached to the first holding portion 20 to the bracket body 16. According to this configuration, the first connector 10 can be kept securely fixed to the first holding portion 20 by the locking portion 25. This further serves to make the first connector 10 less likely to become detached.

It should be noted that the present embodiment may be implemented with the following modifications. The present embodiment and the following modifications may be implemented in combination to the extent that they are technically compatible.

The engaging portion 35 is not limited to the structure in which the protrusion 36 is laterally fitted into the engaged portion 37, but may be modified to a structure in which the protrusion 36 is fitted into a recessed portion, for example.

Any structure of the engaging portion 35 will suffice as long as it can keep the band portion 34 in a closed state.

The rail structure of the first holding portion 20 may be such that the guide rail 22 is provided on the first connector 10 and the movement rails 23 are provided on the connector bracket 14.

Any rail structure of the first holding portion 20 will suffice as long as the first connector 10 can be removably attached to the rail portion.

The band portion 34 may be a cable tie, for example.

The band portion 34 may be disposed at any location as long as it can support the first connector 10.

The second holding portion 21 may be disposed, for example, between the top surface of the first connector 10 and the connector bracket 14. Moreover, the second holding portion 21 may be a structure for supporting the side surfaces of the first connector 10.

The second holding portion 21 is not limited to a band structure, and any structure will suffice as long as the first connector 10 can be held by the connector bracket 14.

A wide variety of structures may be adopted for the locking portion 25 as long as the first connector 10 inserted on the guide rail 22 can be fixed to the bracket body 16.

The first held regions 42 and the second held region 44 may be, for example, aligned in the direction in which the first connector 10 is inserted and pulled out from the connector bracket 14.

The first surface 43, on which the first held regions 42 are located, may not be limited to the top surface of the first connector 10, but may alternatively be a side surface of the first connector 10, for example.

The second surface 45, on which the second held region 44 is located, may not be limited to the bottom surface of the first connector 10, but may alternatively be the top surface or a side surface of the first connector 10, for example.

The first holding portion 20 and the second holding portion 21 may be provided at the same end of the first connector 10.

The portion of the connector bracket 14 for holding the second connector 12 may be omitted therefrom.

The wire harness 2 is not limited to being one electric wire, and may be a group of electric wires that are bundled. Furthermore, the wire harness 2 may be an electric wire surrounded by a coating material.

As shown in FIG. 2, in the connector bracket 14 of a certain embodiment of the present disclosure, the first holding portion 20 or the guide rail 22 may hold the first connector 10 through contact or engagement with a first position of the first connector 10. The second holding portion 21 or the band portion 34 of the connector bracket 14 may hold the first connector 10 through contact or engagement with a second position of the first connector 10 different from the aforementioned first position. The first position and the second position of the first connector 10 may be separated from each other in the sliding direction of the first connector 10. For example, the first position of the first connector 10 may be at the base end of the first connector 10, and the second location of the first connector 10 may be at the leading end of the first connector 10. The first location of the first connector 10 may be at the top surface of the base end of the first connector 10, and the second location of the first connector 10 may be at the bottom and side surfaces of the leading end of the first connector 10. The first holding portion 20 and the second holding portion 21 of the connector bracket 14 may be configured to, for example, suspendingly hold the first connector 10. As shown in FIG. 2, the guide rail 22 and the band portion 34 may be provided on the outermost surface of the connector bracket 14 so that the first connector 10 and the first electric wires 5 are visible from the outside of the connector bracket 14.

The first electric wires 5 of the embodiment may be referred to as signal cables. The connectors 4 of the embodiment may be referred to as signal cable connectors. The connectors 4 of the embodiment may be referred to as signal cable connectors. The guide rail 22 of the embodiment may be referred to as a bracket rail. The movement rails 23 of the embodiment may be referred to as sliding rails or Ethernet (registered trademark) connector rails. The band portion 34 of the embodiment may be referred to as a flexible fastening band. Both or one of the guide rail 22 and the band portion 34 may be made of the same material as that of the bracket body 16 of the connector bracket 14, for example, an insulating resin material.

The present disclosure encompasses the implementation examples below. Some of the matters described in the implementation examples below may be omitted, and some of the matters described in the implementation examples may be selected or extracted and combined.

[Additional Remark 1] One example of the present disclosure is directed to a connector bracket for use with a signal cable connector that includes sliding rails, the connector bracket comprising:

a bracket rail for linearly and slidably engaging the sliding rails of the signal cable connector to detachably support the signal cable connector, and a flexible fastening band wound around the signal cable connector at a location different from the bracket rail for detachably supporting the signal cable connector.

[Additional Remark 2] In one example of the present disclosure, the bracket rail and the flexible fastening band may be provided on an outermost surface of the connector bracket so that the signal cable connector and the signal cables are visible from the outside of the connector bracket.

[Additional Remark 3] In one example of the present disclosure, the connector bracket may be configured to suspendingly hold the signal cable connector using the bracket rail and the flexible fastening band.

[Additional Remark 4] In one example of the present disclosure, the signal cable connector may be configured to be mechanically coupled to another signal cable connector, and the bracket rail and the flexible fastening band may be configured in such a manner as not to interfere with the mechanical coupling and decoupling of the signal cable connector and the other signal cable connector while the bracket rail and the flexible fastening band support the signal cable connector.

Although the present disclosure has been described based on embodiments, it is to be understood that the present disclosure is not limited to these embodiments or structures. The present disclosure also encompasses various variants and variations within the scope of equivalency. In addition, various combinations and forms, and also other combinations and forms that include only one element or more or less elements, fall under the scope and concept of the present disclosure.

LIST OF REFERENCE NUMERALS

1 Vehicle
2 Wire harness
3 Electrical wire
4 Connector
5 First wire
6 Second wire

10 First connector
11 Partner connector
12 Second connector
13 Partner connector
14 Connector bracket
15 Vehicle body
15*a* Vehicle body wall portion
16 Bracket body
19 Holder portion
20 First holding portion
21 Second holding portion
22 Guide rail (rail structure)
23 Movement rail (rail structure)
25 Locking portion
26 Engaging piece
27 Protrusion
28 Main body
29 Lug portion
30 Recessed portion
33 Binding portion
34 Band portion
35 Engaging portion
36 Protrusion
37 Engaged portion
38 Tab portion
39 Regulating portion
42 First held region
43 First surface
44 Second held region
45 Second surface
47 End
48 End

What is claimed is:

1. A connector bracket comprising:

a first holding portion to which a connector provided at one end portion of an electric wire is attached using a rail structure, the first holding portion holding the connector attached to the rail structure using the rail structure; and a second holding portion that holds the connector in cooperation with the first holding portion, wherein the rail structure includes:

a guide rail extending in an insertion direction of the connector and protruding in a direction perpendicular to the insertion direction of the connector; and a movement rail protruding in a direction opposite to a direction in which the guide rail protrudes and configured to slidably engage with the guide rail.

2. The connector bracket according to claim 1 comprising, with the electric wire being a first electric wire and the connector being a first connector, a bracket body that holds a second connector connected to a second electric wire different from the first electric wire.

3. The connector bracket according to claim 1, wherein the first holding portion holds the connector at a first held region of the connector, and the second holding portion holds the connector at a second held region of the connector that is a portion different from the first held region.

4. The connector bracket according to claim 3, wherein the first held region is located on a first surface of the connector, and the second held region is located on a second surface of the connector that is a surface on a side opposite to the first surface.

5. The connector bracket according to claim 1, wherein the first holding portion and the second holding portion are disposed at one end portion and another end portion, respectively, of the connector in the insertion direction of the connector.

6. The connector bracket according to claim 1, wherein the second holding portion is a band portion that supports the connector by surrounding the connector with a band-shaped binding portion.

7. The connector bracket according to claim 6, wherein the band portion supports a portion of the connector where a partner connector is connected.

8. The connector bracket according to claim 6 comprising, with the electric wire being a first electric wire and the connector being a first connector, a bracket body that holds a second connector connected to a second electric wire different from the first electric wire, wherein the band portion is integrally formed with the bracket body.

9. The connector bracket according to claim 6, wherein the band portion includes an engaging portion that keeps the binding portion in a closed state where the connector is held by the binding portion.

10. The connector bracket according to claim 9, wherein the band portion includes a tab portion serving as a portion by which the binding portion is gripped when the binding portion is opened and closed.

11. The connector bracket according to claim 10, wherein the band portion includes a regulating portion that regulates an operation to push the tab portion in a direction in which the closed state of the binding portion is released.

12. The connector bracket according to claim 1 comprising, with the electric wire being a first electric wire and the connector being a first connector, a bracket body that holds a second connector connected to a second electric wire different from the first electric wire, wherein the connector bracket includes a locking portion that locks the connector attached to the first holding portion to the bracket body.

13. The connector bracket according to claim 12, wherein the guide rail protrudes from the bracket body, and the movement rail protrudes from the first connector.

14. The connector bracket according to claim 1, wherein the rail structure further includes a locking portion provided with a protrusion and an engaging piece that engages with the protrusion.

15. A wire harness comprising:

a connector bracket including:

a first holding portion to which a connector provided at one end portion of an electric wire is attached using a rail structure, the first holding portion holding the connector attached to the rail structure using the rail structure, and the electric wire having at an end portion thereof the connector held by the connector bracket; and a second holding portion that holds the connector in cooperation with the first holding portion, wherein the rail structure includes:

a guide rail extending in an insertion direction of the connector and protruding in a direction perpendicular to the insertion direction of the connector; and a movement rail protruding in a direction opposite to a direction in which the guide rail protrudes and configured to slidably engage with the guide rail.

* * * * *